United States Patent
Hawkins et al.

(10) Patent No.: US 7,314,343 B2
(45) Date of Patent: Jan. 1, 2008

(54) MINIATURE MANIPULATOR FOR SERVICING THE INTERIOR OF NUCLEAR STEAM GENERATOR TUBES

(75) Inventors: Phillip J. Hawkins, Irwin, PA (US); Lyman J. Petrosky, Latrobe, PA (US)

(73) Assignee: Westinghouse Electric Co. LLC, Pittsburgh, PA (US)

( * ) Notice: Subject to any disclaimer, the term of this patent is extended or adjusted under 35 U.S.C. 154(b) by 341 days.

(21) Appl. No.: 10/620,013

(22) Filed: Jul. 15, 2003

(65) Prior Publication Data

US 2004/0131462 A1 Jul. 8, 2004

Related U.S. Application Data

(60) Provisional application No. 60/398,000, filed on Jul. 22, 2002.

(51) Int. Cl.
F22B 37/00 (2006.01)
(52) U.S. Cl. ............. 414/749.4; 165/11.2; 165/DIG. 3; 294/94; 180/8.5; 901/1
(58) Field of Classification Search ............... 165/11.2, 165/DIG. 3; 901/1; 180/8.5–8.6; 294/94, 294/96; 414/746.5, 749.1–749.4; 29/890.031
See application file for complete search history.

(56) References Cited

U.S. PATENT DOCUMENTS

| | | | | |
|---|---|---|---|---|
| 3,889,820 A | * | 6/1975 | Ranger ........................ 414/676 |
| 3,913,452 A | * | 10/1975 | Ward et al. .................... 180/8.1 |
| 3,913,752 A | * | 10/1975 | Ward et al. ............... 414/749.4 |
| 3,934,731 A | * | 1/1976 | Muller et al. ............. 414/749.1 |
| 4,004,698 A | * | 1/1977 | Gebelin .......................... 414/4 |
| 4,018,344 A | * | 4/1977 | Leshem ...................... 165/11.2 |
| 4,018,345 A | * | 4/1977 | Formanek et al. ......... 165/11.2 |
| 4,018,346 A | * | 4/1977 | Leshem et al. ............ 165/11.2 |
| 4,070,561 A | * | 1/1978 | Shunichi et al. ............... 700/13 |
| 4,074,814 A | * | 2/1978 | Cooper et al. ........... 414/749.3 |
| 4,158,415 A | * | 6/1979 | Young ............................ 414/2 |
| 4,200,424 A | * | 4/1980 | Gerkey et al. ........... 414/744.6 |
| 4,213,732 A | * | 7/1980 | Cooper, Jr. .................. 414/728 |
| 4,216,893 A | * | 8/1980 | Glatthorn ...................... 228/45 |
| 4,261,094 A | * | 4/1981 | Gerkey et al. ................. 29/727 |
| 4,298,054 A | * | 11/1981 | Adamowski ............... 165/11.2 |

(Continued)

FOREIGN PATENT DOCUMENTS

DE        2552341 A  *  6/1976

(Continued)

*Primary Examiner*—Saul Rodriguez
*Assistant Examiner*—Charles Greenhut

(57) ABSTRACT

A manipulator for servicing tubes extending through a tube sheet having three major components: a base member, a block member, and a foot member. The base member has a holder for supporting tooling or inspection devices. The base member also has at least one gripper for releasably gripping a tube extending through the tube sheet. The block member is connected to the base member for linear movement and rotation relative to the base member. The foot member is connected to the block member for linear movement relative to the block member. The foot member has at least one, and preferably two grippers, for releasably gripping a tube extending through the tube sheet. The manipulator supports itself using the two sets of expandable and translatable grippers that anchor into the tube ends and can move from tube to tube by alternately engaging each set of grippers.

11 Claims, 12 Drawing Sheets

U.S. PATENT DOCUMENTS

| | | | |
|---|---|---|---|
| 4,329,769 A * | 5/1982 | Glatthorn | 483/53 |
| 4,345,658 A * | 8/1982 | Danel et al. | 180/8.5 |
| 4,373,855 A * | 2/1983 | Lebouc | 228/32 |
| 4,406,856 A * | 9/1983 | Wilkins et al. | 376/260 |
| 4,425,296 A * | 1/1984 | Adamowski et al. | 376/245 |
| 4,427,317 A * | 1/1984 | Wilhelm | 403/31 |
| 4,438,805 A * | 3/1984 | Gugel | 165/11.2 |
| 4,449,599 A * | 5/1984 | Creek | 180/8.1 |
| 4,521,150 A * | 6/1985 | Pigeon et al. | 414/749.4 |
| 4,521,844 A | 6/1985 | Sturges, Jr. et al. | |
| 4,592,691 A * | 6/1986 | Lebouc et al. | 414/4 |
| 4,639,994 A * | 2/1987 | Cooper et al. | 29/402.01 |
| 4,643,472 A * | 2/1987 | Schukei et al. | 294/94 |
| 4,653,971 A * | 3/1987 | Bernardin | 414/8 |
| 4,662,465 A * | 5/1987 | Stewart | 180/8.1 |
| 4,673,027 A | 6/1987 | Vermaal | |
| 4,688,327 A * | 8/1987 | Cooper et al. | 29/726 |
| 4,718,377 A * | 1/1988 | Haller | 122/510 |
| 4,790,065 A * | 12/1988 | Cooper et al. | 29/723 |
| 4,790,400 A * | 12/1988 | Sheeter | 180/8.6 |
| 4,804,038 A * | 2/1989 | Klahn et al. | 165/11.2 |
| 4,829,648 A * | 5/1989 | Arzenti et al. | 29/890.031 |
| 4,924,933 A * | 5/1990 | Richter et al. | 165/76 |
| 4,940,382 A * | 7/1990 | Castelain et al. | 414/749.1 |
| 4,984,627 A * | 1/1991 | LeBourgeois | 165/11.2 |
| 5,061,176 A * | 10/1991 | Zafred et al. | 432/5 |
| 5,109,915 A * | 5/1992 | Osusko | 165/11.2 |
| 5,117,897 A * | 6/1992 | Robert | 165/11.2 |
| 5,165,470 A * | 11/1992 | Maekawa et al. | 165/76 |
| 5,178,820 A | 1/1993 | Glass, III et al. | |
| 5,351,626 A * | 10/1994 | Yanagisawa | 180/8.6 |
| 5,351,773 A * | 10/1994 | Yanagisawa | 180/8.5 |
| 5,355,063 A * | 10/1994 | Boone et al. | 318/568.11 |
| 5,429,009 A * | 7/1995 | Wolfe et al. | 73/865.8 |
| 5,559,843 A * | 9/1996 | Amiet et al. | 376/261 |
| 5,611,948 A * | 3/1997 | Hawkins | 219/121.63 |
| 6,105,695 A * | 8/2000 | Bar-Cohen et al. | 180/8.5 |
| 6,278,903 B1* | 8/2001 | Iwasaki et al. | 700/245 |
| 6,681,839 B1* | 1/2004 | Balzer | 165/11.2 |
| 2004/0131462 A1* | 7/2004 | Hawkins et al. | 414/745.3 |

FOREIGN PATENT DOCUMENTS

| | | | |
|---|---|---|---|
| JP | 02019761 A | * | 1/1990 |
| JP | 11174032 A | * | 7/1999 |

* cited by examiner

MINIATURE MANIPULATOR FOR SERVICING THE INTERIOR OF NUCLEAR STEAM GENERATOR TUBES

CROSS-REFERENCE TO RELATED APPLICATION

The present application is a traditional application based on U.S. Provisional Application Ser. No. 60/398,000, filed Jul. 22, 2002.

BACKGROUND OF THE INVENTION

1. Field of the Invention

This invention generally concerns robotic systems and is specifically concerned with an improved robotic lightweight system for servicing the heat exchanger tubes of a nuclear steam generator.

2. Related Art

In a pressurized water nuclear powered electric generating system, the heat generated by the nuclear reaction is absorbed by a primary coolant that circulates through the reactor core and is utilized to generate steam in a steam generator. The steam generator typically is an upright cylindrical pressure vessel with hemispherical end sections. A traverse plate called a tube sheet, located at the lower end of the cylindrical section, divides the steam generator into a primary side, which is the lower hemispherical section below the tube sheet, and a secondary side above the tube sheet. A vertical wall bisects the primary side into an inlet section and an outlet section. The tube sheet is a thick carbon steel plate with an array of thousands of holes into which are inserted the ends of U-shaped tubes. One end of each U-shaped tube is inserted into a hole within the tube sheet which communicates with the inlet section of the primary side and the other end is inserted in a hole within the tube sheet which communicates with the outlet section. The primary coolant is introduced under pressure into the inlet section of the primary side, circulates through the U-shaped tubes and exits through the outlet section. Water introduced into the secondary side of the steam generator circulates around the U-shaped tubes and is transformed into steam by heat given up by the primary coolant.

Occasionally during the operation of the steam generator, degradation occurs in some of the tubes. This is undesirable because the primary coolant is radioactive and any leakage of the reactor coolant into the secondary side of the generator contaminates the steam. It is generally not practical, however, to replace degraded tubing, but instead the steam generator is periodically inspected and the effected tubes are plugged at both ends. In view of the thousands of tubes in the steam generator, plugging of a few tubes does not appreciably affect the efficiency of the heat transfer.

Because of the radiation hazard present in steam generators used in a nuclear powered utility, the heat exchanger tubes of such steam generators must be, for the most part, remotely serviced to avoid exposing maintenance personnel to potentially harmful radiation. Consequently, a number of robotic systems have been developed for remotely performing repair and maintenance operations on these heat exchanger tubes. These robotic systems typically include some sort of robotic delivery arm in combination with any one of a number of specialized tools designed to be carried by the robotic arm, which are known in the art as "end effectors". These robotic systems mostly fall into two basic categories, which shall be referred to in this application as full movement arms, and limited movement arms. Full movement arms are capable of maintaining an end effector at a desired orientation while moving it along a trajectory having components in all three spatial axes. By contrast, limited movement arms generally are capable of moving an end effector only along a selected two-dimensional trajectory, and cannot maintain the end effector at a desired orientation along this trajectory. The mechanical action of limited movement robotic arms often resembles the operation of a compass used to draw circles, i.e., one end of the arm is pivotally mounted at a point on a flat tube sheet within the channel head of the nuclear steam generator, while the middle portion of the arm is telescopically extendable or retractable. Such arms are capable of sweeping their distal, tool-holding ends across any one of a number of arcs of greater or lesser radii which intersect with desired delivery points on the tube sheet. An example of such a limited movement robotic arm is the model SM-22 arm manufactured by Zetech located in Isaquah, Wash.

Full movement arms differ from the relatively simple structure of the previously described arms in that they include six different segments which are articulated at six different motor driven joints, which in turn allows movement around six different axes. The more complex structure of such robotic arms allow them to use three of their axes of movement to hold an end effector at a desired orientation, and the other three axes to move the end effector across an infinite number of trajectories in three dimensions while maintaining the end effector at the desired orientation. Such abilities are highly advantageous in situations where it is essential to maintain the end effector at a constant orientation during a servicing operation, as is often the case with a weld head being moved around the location of a desired weld seam. While limited movement arms are often necessarily dedicated to the delivery and manipulation of a single end effector, such as for example a tube inspection probe, full movement arms have the ability in theory to couple onto and decouple from a variety of end effectors. One of the most advanced designs of such a full movement robotic arm is the ROSA (Remotely Operated Service Arm) developed by Westinghouse Electric Corporation located in Pittsburgh, Pa.

Unfortunately, neither of these types of robotic arm is without drawbacks. While limited movement robotic arms are relatively simple and inexpensive to construct and to install in nuclear steam generators, the fact that they are typically dedicated to a single end effector necessitates the installation and removal of a number of such arms to complete inspection and servicing operations on the heat exchanger tubes within the channel head of the steam generator. This is a significant shortcoming as every such installation procedure is not only laborious and time-consuming, but also results in the exposure of the operating personnel to potentially harmful radiation. This last drawback is of growing importance, as the NRC has placed greater limitations upon the amount of radiation exposure that such operating personnel may absorb. Moreover, the fact that such limited movement robotic arms can not maintain an end effector at a desired orientation while simultaneously moving it across a chosen trajectory across the tube sheet renders them useless for end effectors that require a constant orientation, such as weld heads. Of course, full movement robotic arms such as the aforementioned ROSA are not limited in these ways. However, prior art full movement robotic arms such as ROSA also have limitations that offer room for improvement. Specifically, the Applicants have noticed that a vertically oriented "elbow" of the ROSA disadvantageously limits the number and length of the possible trajectories that the distal end of the arm may make without mechanically interfering with the bowl-like wall of the channel head, or the divider plate within the channel head, or the cables which vertically drape down from end effectors such as the eddy current probes used to inspect and determine the condition of the interior walls of the heat exchanger tubes. Applicants have also observed that the prior art ROSA is configured so that a large portion of the arm is cantileverly supported from its vertically oriented elbow, which in turn applies a significant amount of life-reducing extraneous torque to the electric motor driving the joint, and reduces its payload carrying capability. Further, Applicants have observed that the motion of the distal end of such robotic arms is not smooth enough to conduct certain weld operations.

Servicing of nuclear steam generators has changed dramatically in the last twenty (20) years. In the past, much of the older steam generator tubing became degraded and required significant plugging, sleeving, or total steam generator replacement. Power plant service outages were of long duration and the repairs to steam generators required sophisticated robotic manipulators such as ROSA and tooling with the capability to perform varied inspections and repairs while avoiding plugged tubes.

Presently, most utilities in the industry have either replaced their steam generators or have generators with few plugged tubes and require minimal repairs. Most of the work for the steam generator tubing involves eddy current inspection with few or no plugs required. Outage time for plant maintenance and refueling, which dictates the length of the outage, is reduced, significantly decreasing the time allotted for steam generator inspection and service. There is a clear need to improve upon existing robotic systems for servicing steam generators to meet the current needs. Current steam generator manipulators are generally heavy (greater than 100 lbs.) and sophisticated, which adds time and personnel radiation exposure to transport, set up, and install in the steam generators. Current manipulators are also too large in size to install multiple manipulators in either section of most steam generator channel heads. Use of a single manipulator to position more than two eddy current probes simultaneously has not been very successful because failure of one probe will generally result in the same number of robotic moves as if one or two probes were used. Additionally, steam generator robotics generally have three or more degrees of freedom along with multiple motors with position feedback. The control system along with the complexity of the manipulator are generally expensive to purchase and maintain. Furthermore, most manipulators, when installed in the steam generator, are anchored and must be moved to gain access to all the tubes during inspection. In addition, position adjustment and verification is usually required due to the varied deflection of the manipulator under load coupled with inaccuracy of the robot.

Accordingly, a simple, small, light-weight robot is desired that can function as a steam generator inspection and/or plugging manipulator. Preferably, such a manipulator has a weight of approximately 30 lbs. or less and should have an approximately 70 lb. or greater payload capacity.

SUMMARY OF THE INVENTION

This invention meets the foregoing objectives by providing a simple, relatively small steam generator manipulator that employs a combination of pneumatics, hydraulics and a single motorized axis. The manipulator is made up of three basic components; a base member, a block member, and a foot member. The base member has at least one, and preferably two, grippers for releasably gripping a tube extending through a tube sheet. The base member also supports an end effector, i.e., a tool or inspection device, for performing the desired service operation. The block member is connected to the base member in a manner that provides linear movement and rotation relative to the base member. The foot member is connected to the block member in a manner that provides linear movement relative to the block member. The foot member also has at least one, and preferably two, grippers for releasably gripping a tube extending through the tube sheet. The block member has two directions of linear travel between the block member and the base member, preferably in the horizontal and vertical directions. In the preferred embodiment, the grippers exert a force in a direction to draw the member associated with at least one of the grippers toward the tube sheet where limit pins maintain the member a predetermined distance from the tube sheet. With the limit pins tightly against the tube sheet, the manipulator is forced to stay parallel and in close proximity to the tube sheet. The grippers are preferably pneumatically operated and are provided with a spring-bias in a gripping position so that the manipulator does not lose support upon the loss of compressed air feed. In the preferred embodiment, the manipulator assembly is approximately 30 lbs. or less with the ability to support approximately a 70 lb. payload, i.e., end effector.

BRIEF DESCRIPTION OF THE DRAWINGS

A further understanding of the invention can be gained from the following description of the preferred embodiments when read in conjunction with the accompanying drawings in which.

DETAILED DESCRIPTION OF THE PREFERRED EMBODIMENT

Figure 1:
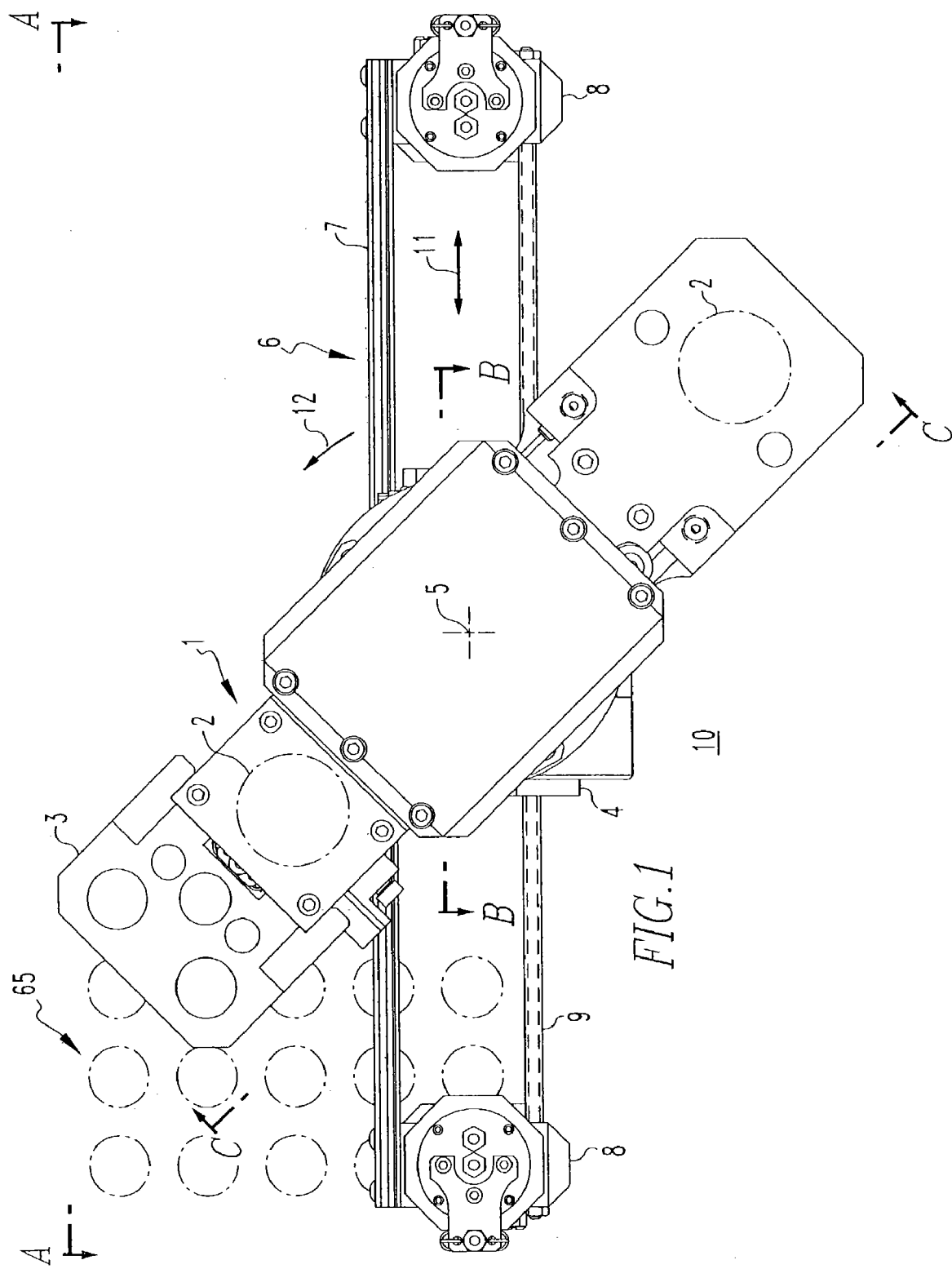
FIG. 1 is a bottom view of the underside of the manipulator of this invention mounted to a tube sheet of a nuclear steam generator.

FIG. 1 shows the manipulator 10 of this invention mounted to a tube sheet 65 of a nuclear steam generator. The invention supports itself using two sets of expandable and translatable grippers 8 and 2 that anchor into the steam generator tube ends. There are three major components that comprise the invention. The first major component, the base member 1, contains a set of grippers 2, solenoids 38 (that will be described hereafter with regard to FIGS. 7 and 9) to operate the manipulator and a rotation mechanism 64 (that will be described hereafter with regard to FIG. 8) and serves as a framework for attachment of cabling and end effectors. A guide block 3 for eddy current inspection is shown attached to the base 1. The end effectors attach to the guide block as will be described hereafter The second major component is the cylinder block 4. The cylinder block contains a linear drive motor and can rotate with respect to the base member 1 about axis 5. As is described in more detail later, the cylinder block can translate along axis 5. The third major component is the foot 6. The foot contains a linear slide 7, two grippers 8 and a lead screw 9. The foot can travel in the direction 11 relative to the cylinder block 4.

When base grippers 2 are installed in respective tubes extending through the tube sheet 65, the foot can be moved past one or several tubes along direction 11. The foot grippers 8 are then installed securing the manipulator. With the foot grippers 8 installed and the base grippers 2 disengaged, the base may be indexed along direction 11. For each movement of the foot or base, there is a vertical translation along axis 5 and within the gripper as later described. As can be seen, the predominant direction of motion is in one direction 11. To change the direction of motion and orientation of the apparatus, the foot can rotate about axis 5 as shown with arrow 12. Changing the orientation of the manipulator is accomplished by alternately engaging and releasing the foot and base grippers, respectively 8 and 2, and performing a rotational move. Typically, the rotation can be 90° for tubing on a square pitch or 60° for tubing on a triangular pitch. With the ability to rotate, the manipulator 10 becomes extremely flexible and simplified as only one linear drive axis is required.

Figure 2:
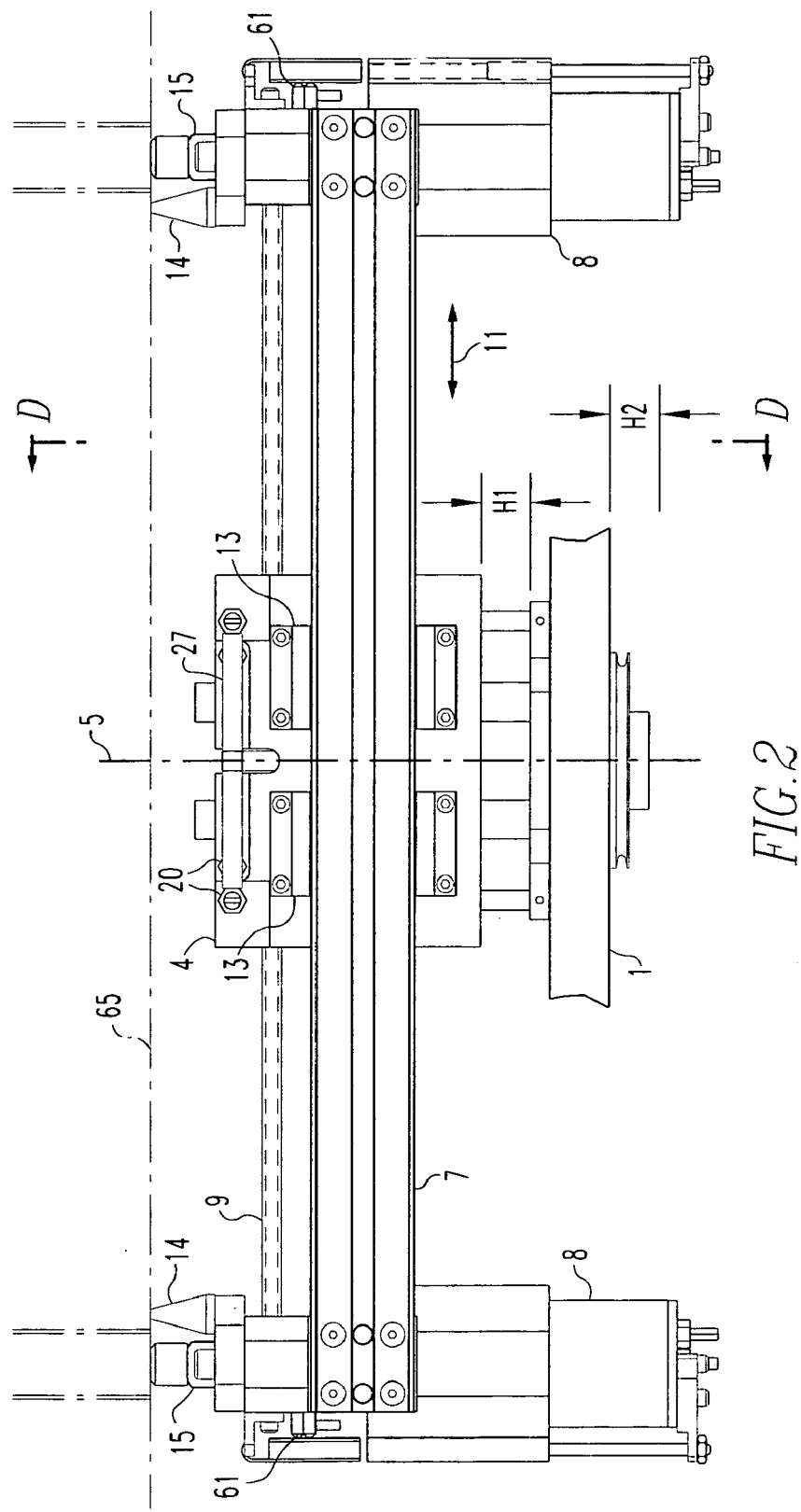
FIG. 2 is a side view of the foot and cylinder block of this invention viewed from the direction A-A of FIG. 1.

FIG. 2 is a side view of the foot 6 and cylinder block 4. For clarity, only a portion of the base 1 is shown. Attached to the cylinder block 4 are two linear slide blocks 13 that permit free travel of linear rail 7 with attached foot grippers 8 along direction 11. To move the foot along direction 11, lead screw 9 is provided. The lead screw nut is driven internally in the cylinder block 4 as will be shown hereafter. To provide clearance between the tube sheet 65 and standoff pins 14, the foot 6, while supported by the base 1, is lowered (as shown by dimension H1) for the move. Similarly, for the base 1 to move with the foot 6 secured, the base 1 is lowered (as shown by dimension H2). For each of the grippers 2 and 8, the fingers 15 can be translated into the tube as will be described hereafter.

Figure 3:
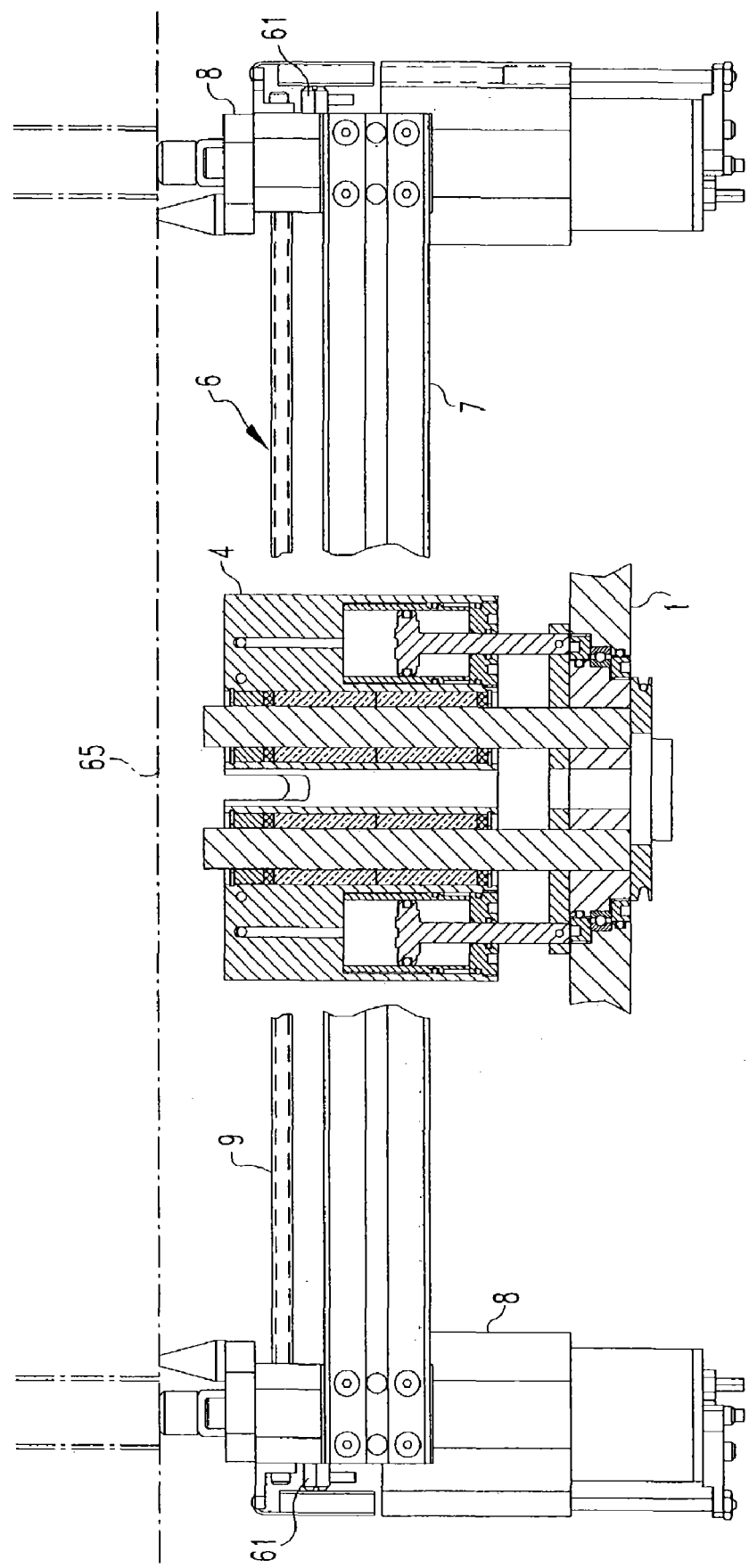
FIG. 3 is a sectional view taken along the lines B-B of FIG. 1 through the cylinder block member and base member of this invention.
Figure 4:
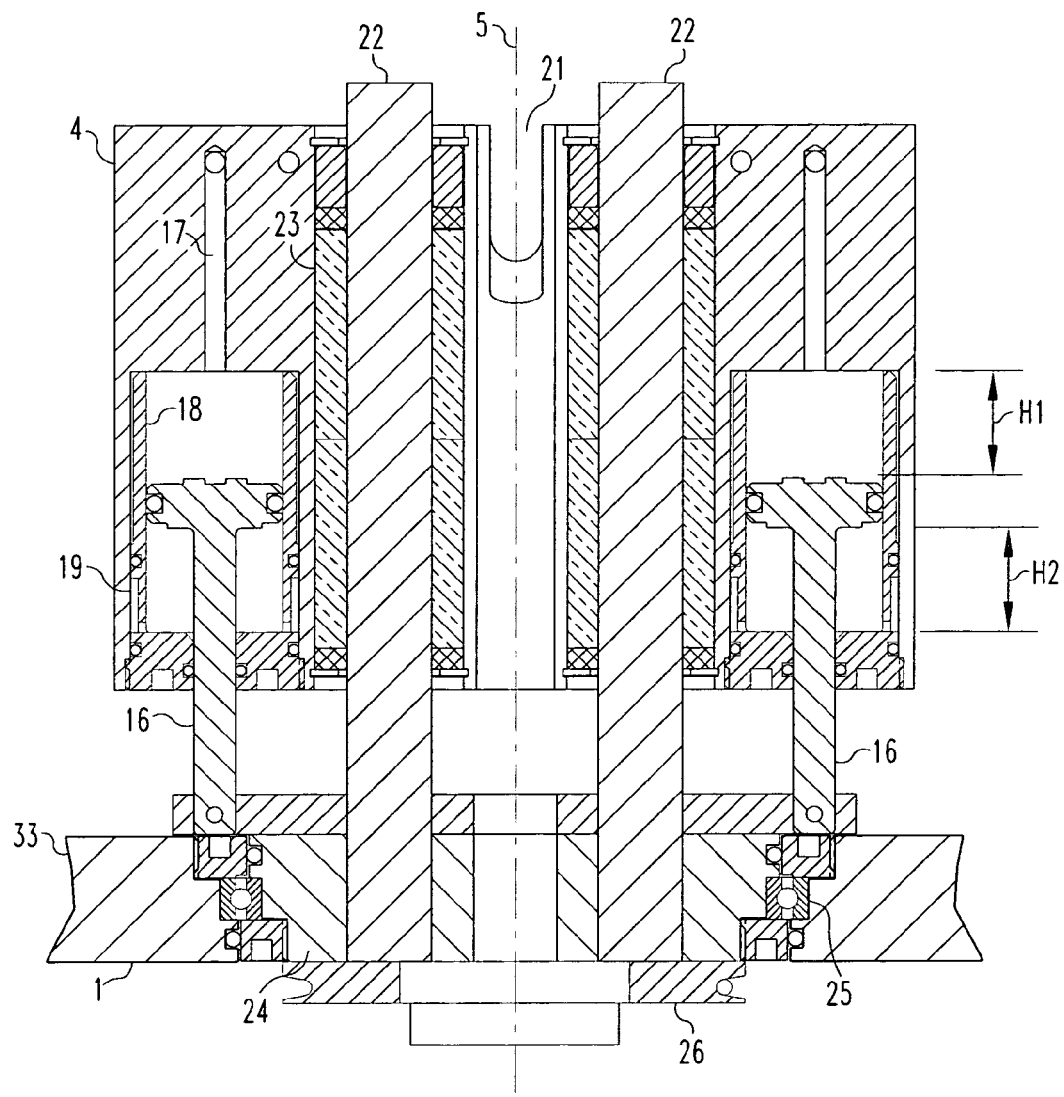
FIG. 4 is an enlarged view of the cylinder block shown in FIG. 3.

FIG. 3 shows a section of the cylinder block and base 1 taken along the lines B-B of FIG. 1. The section of the cylinder block shown in FIG. 3 is enlarged in FIG. 4. As shown in FIG. 4, there are two pneumatically actuated pistons 16 used to provide travel H1 or H2 as described earlier. Approximately 100 lbs. of force is obtained with the pistons 16 and the actuation is rapid due to the low viscosity of compressed air. Air is provided to cylinders 18 through ports 17 or annular area 19 depending upon the direction of desired travel. The compressed air is introduced into the cylinder block 4 through hoses 27 and fittings 20 shown in FIG. 2. The hoses (not shown in FIG. 4) pass through annulus 21 along axis 5 to pneumatic solenoid valves 38 (shown in FIG. 9) in the base 1. Routing hoses and other conduits on the axis of rotation provides protection and reduces cable management problems which otherwise arise when routed off the axis of rotation. To reduce weight, the cylinder block 4 is constructed of an aluminum alloy. For wear, cylinders 18 are constructed from steel. In order for the base 1 to translate freely with respect to the cylinder block 4, two linear shafts 22 housed in four linear bearings 23 are utilized. The linear bearings and shafts also provide rotational rigidity between yoke 24 and cylinder block 4. Ball bearing 25 permits rotation of base 1 with yoke 24 and hence cylinder block 4 and foot 6. The rotation actuation mechanism utilizes pulley 26 and will be described hereafter.

Figure 5:
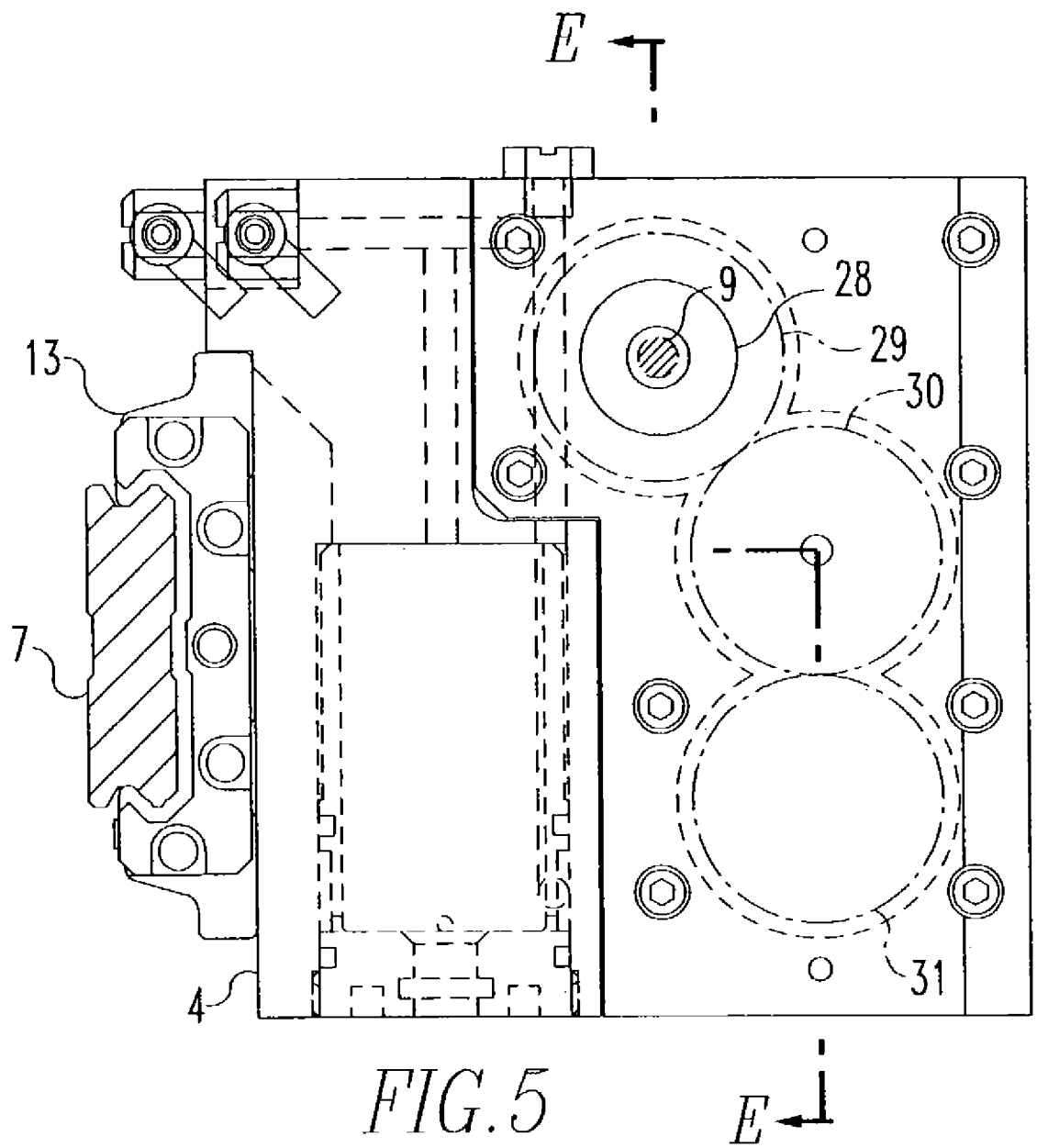
FIG. 5 is a sectional view taken along the lines D-D of FIG. 2 and shows the slide of the cylinder block member.
Figure 6:
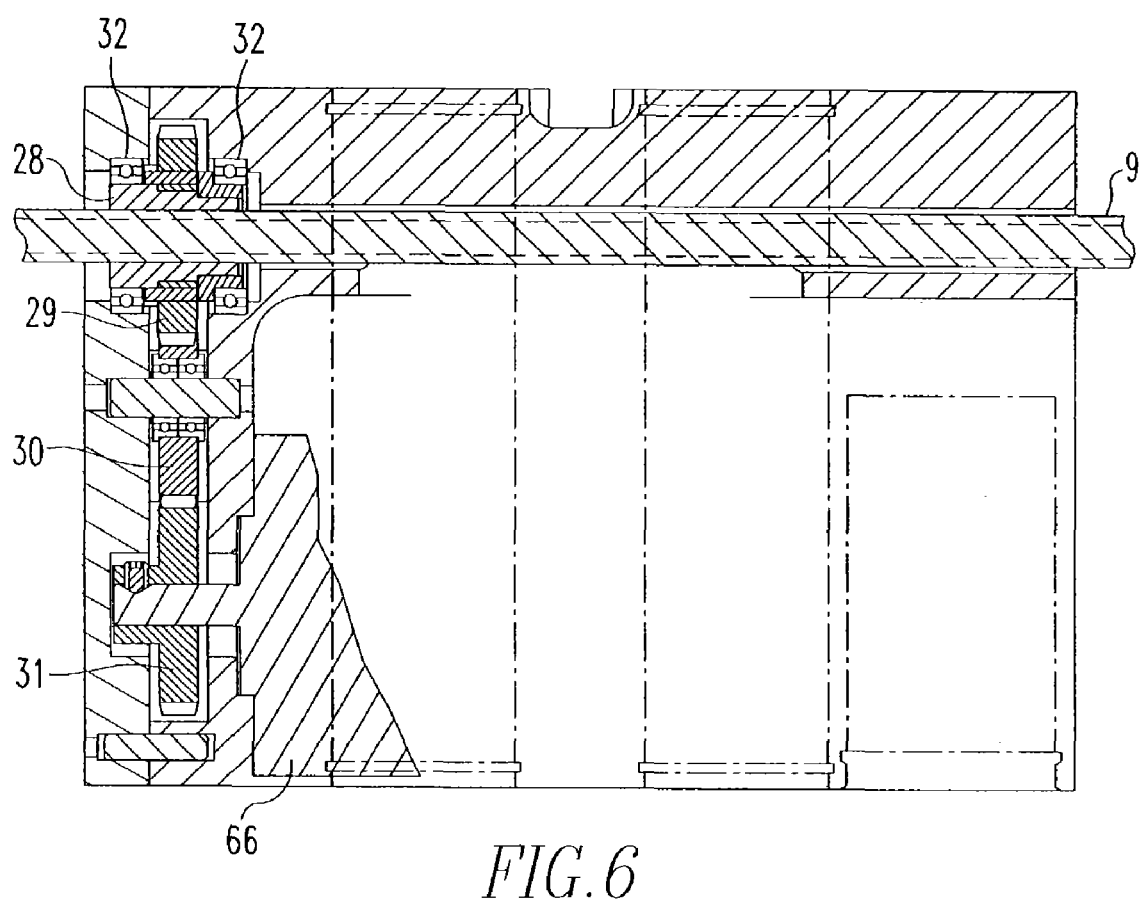
FIG. 6 is a sectional view taken along the lines E-E of FIG. 5 through the cylinder block member and shows the drive train of this invention.

FIG. 5 is a sectional view taken along the lines D-D of FIG. 2 and shows the side of the cylinder block 4. Linear rail 7 passes through linear slide blocks 13 when moved by lead screw 9. Lead screw 9 is rotationally fixed and is driven by nut 28 coupled to gear 29 which meshes with idler gear 30 and motor gear 31. Section EE taken through the cylinder block of FIG. 5 shows the drive train in FIG. 6. As seen in FIG. 6, lead screw nut 28 is supported with ball bearings 32, which provide rotation of the nut while providing sufficient axial support to restrict motion along the direction of the lead screw. The nut can be driven at high speed without rotational instability of the lead screw in the apparatus. Servomotor 66 is used to drive the gear train.

Figure 7:
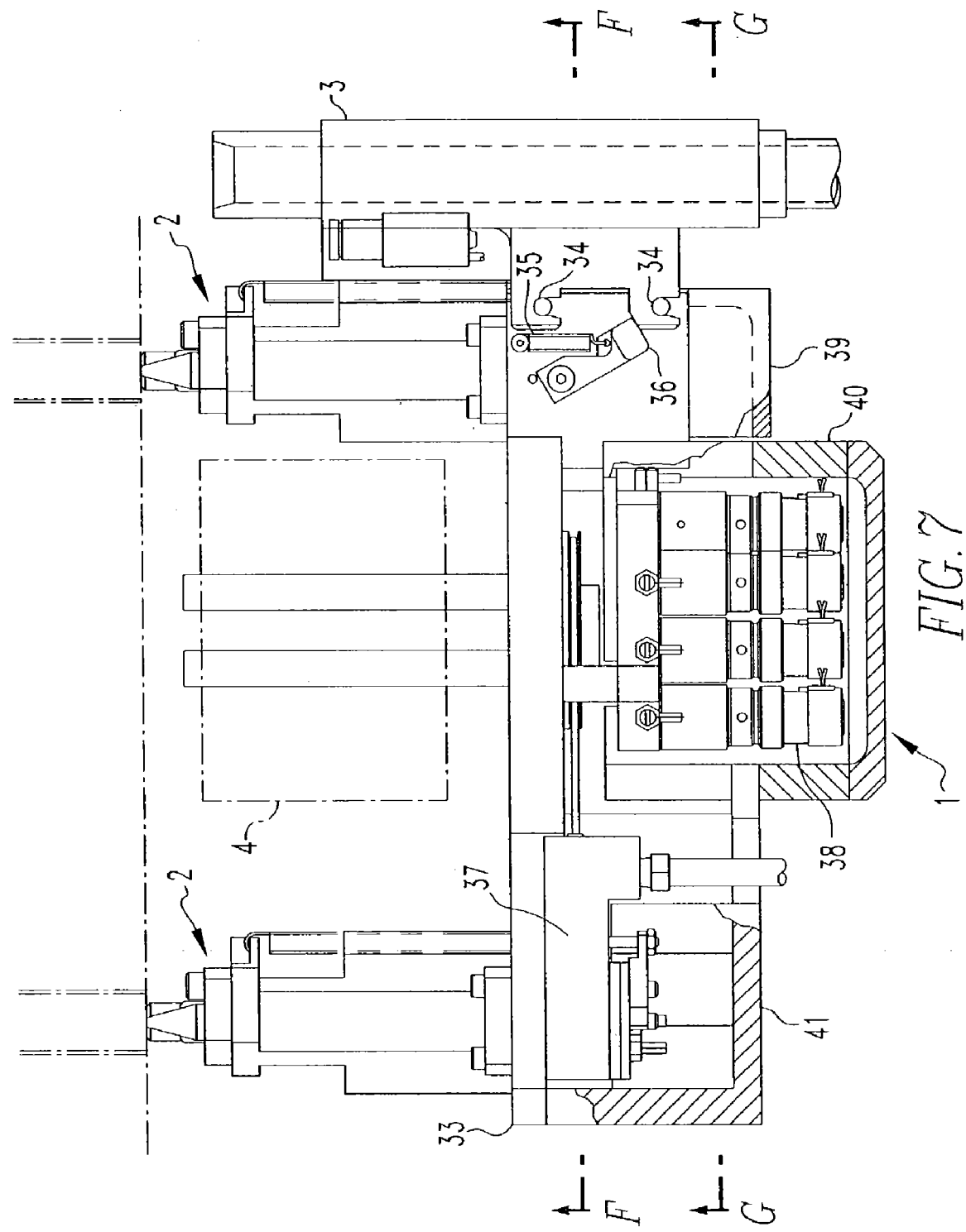
FIG. 7 is a sectional view taken along the lines C-C in FIG. 1 and shows the base member with the cylinder block member shown in phantom.

FIG. 7 is a sectional view taken along the lines C-C of FIG. 1 and shows the base 1. Cylinder block 4 is shown in phantom in FIG. 7. Two base grippers 2 coupled to base plate 33 are used for anchorage to the tube sheet at the appropriate time. The base and foot grippers, respectively 2 and 8, have identical internal operation. Also shown in FIG. 7 is a side view of the end effector guide block 3. The block can be quickly coupled to the base by sliding over four pins 34. Spring 35 attached to lever 36 retains the guide block when coupled. The end effector can be an eddy current probe, a plugging tool or other servicing tool with the orientation of the tool controlled by the guide block 3.

To provide rotation between the base 1 and the foot 6, two hydraulic cylinders 37 are used. The hydraulic fluid, at approximately 800 psi, provides the required force in a small package. The speed is not critical because the frequency of directional changes is low. The rotation mechanism is described more fully with regard to FIG. 8.

Actuation of the cylinder block 4, base grippers 2 and foot grippers 8 is controlled with eight high flow pneumatic/electronic valves 38. Pneumatic/electronic valves identified by Part Number EV·3M-24 and Booster EV·B-3, manufactured by Clippard Instrument Laboratory, Inc., having its principal offices located in Cincinnati, Ohio, may be used for this purpose. With the valves located locally, flow loss in connecting tubing is minimized providing rapid actuation of components. For protection of the hoses and cabling, front cover 39, solenoid housing 40 and rear cover 41 are provided.

Figure 8:
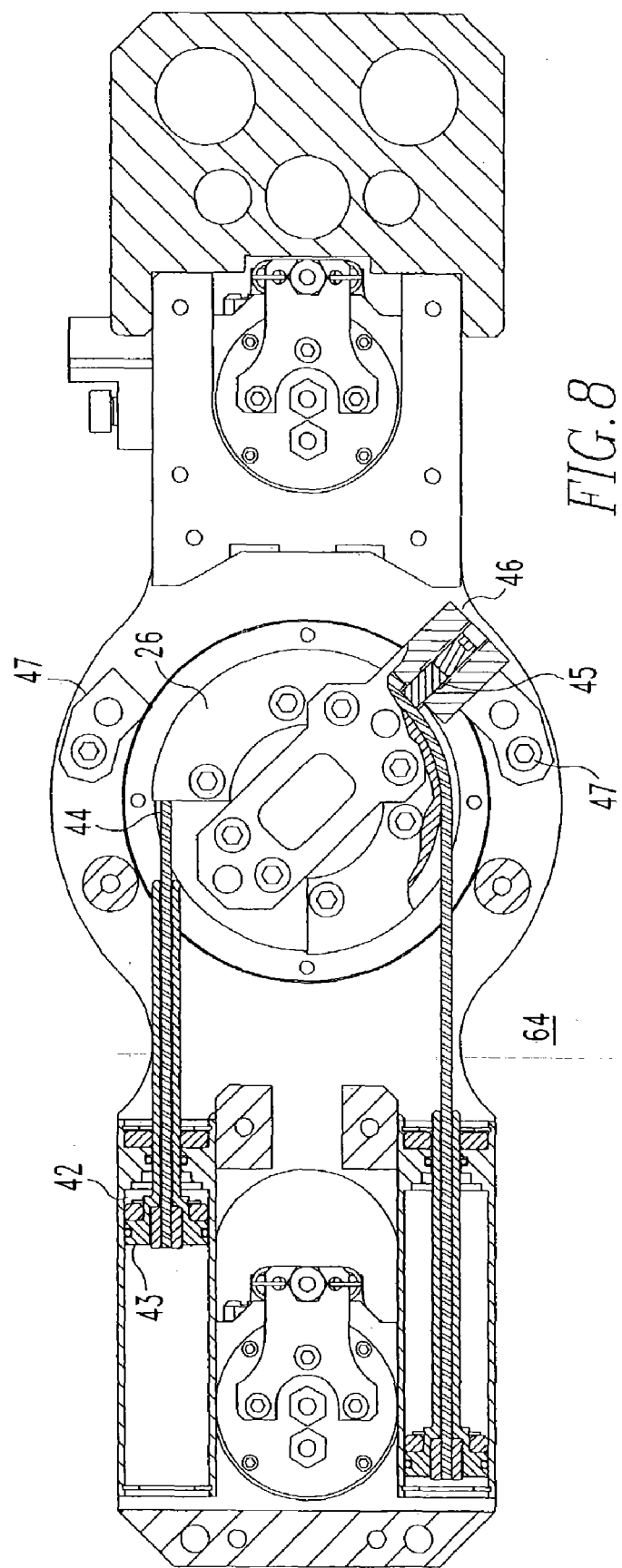
FIG. 8 is a sectional view taken the lines F-F of FIG. 7 and shows the rotation mechanism of this invention.

FIG. 8 is a sectional view taken along the lines F-F of FIG. 7 and shows the rotation mechanism of this invention. To rotate the mechanism, hydraulic fluid is introduced in chamber 42 forcing one piston 43 to translate and draw tension on cable 44. Cable 44 is coupled to pulley 26 with plunger 45. As the cable 44 translates, block 46 rotates until contact is made with stop 47. Stops 47 can be accurately located and pinned for 90° or 60° rotation.

Figure 9:
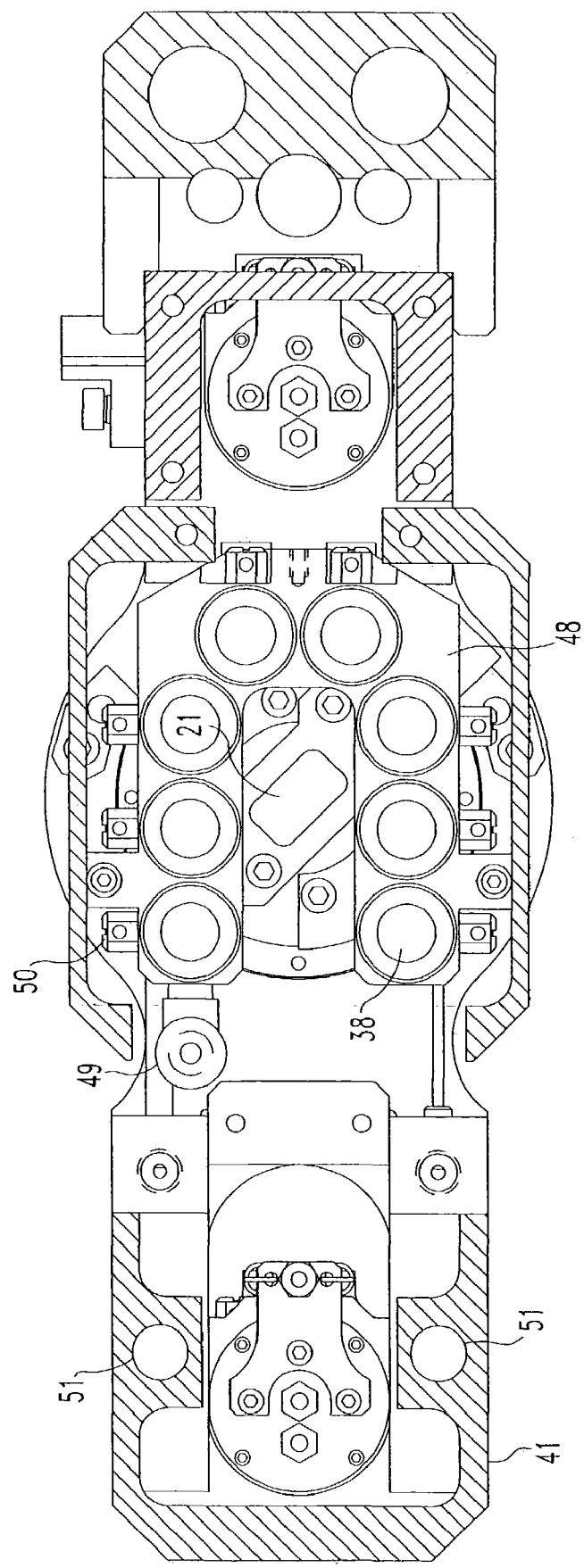
FIG. 9 is a sectional view taken along the lines G-G of FIG. 7 and shows the pneumatic valve arrangement of this invention.

FIG. 9 is a sectional view taken along the lines G-G of FIG. 7 and shows the eight pneumatic valves 38 attached to a "U" shaped manifold 48. Compressed air is supplied to the manifold through fitting 49 and exits through the respective fitting 50 when a valve is actuated. The shape of the manifold provides access to annulus 21 for routing of hoses and cables. Two holes 51 are provided in rear cover 41 to accept the pins from a loading fixture that is used to remotely load the manipulator 10 in through the steam generator manway to the tube sheet where the grippers can be actuated to support the manipulator.

Figure 10A:
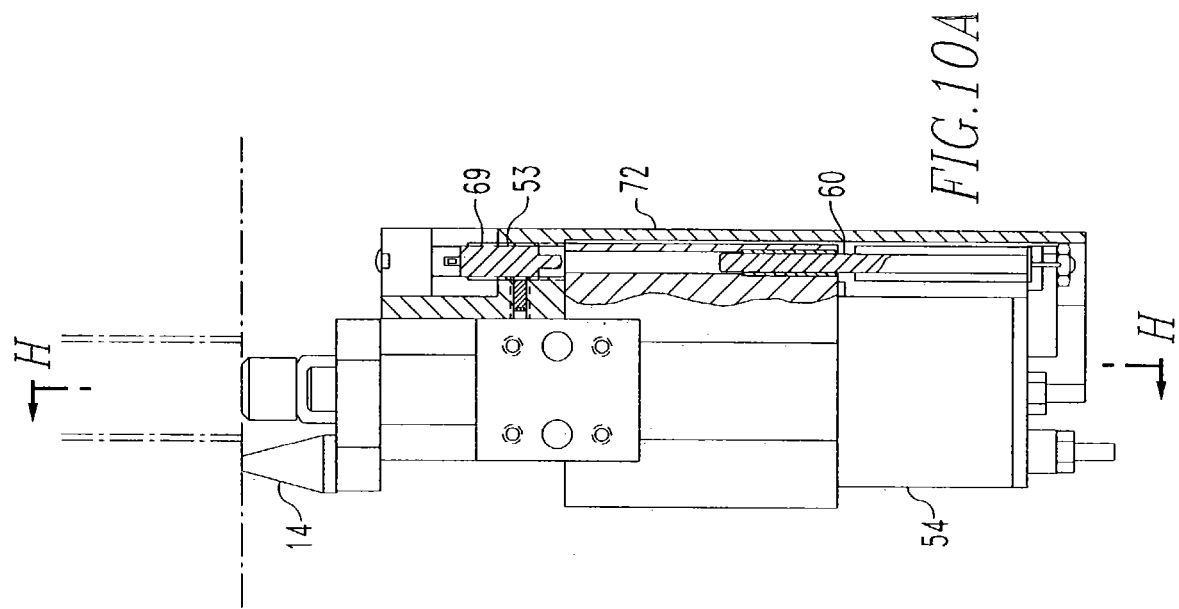
FIG. 10A is a side view of a gripper used to secure the manipulator to the tube sheet.

FIG. 10A shows a camlock gripper used to secure the manipulator 10 to the tube sheet 65. As described earlier, standoff pins 14 are placed in contact with the tube sheet using the cylinder block 4. Compressed air is released from chamber 52 (FIG. 10B) through fitting 61 (shown in FIGS. 2 and 3) permitting springs 53 to raise actuator cylinder 54 placing gripper fingers 55 within the steam generator tube. Guide pin 60 maintains alignment of the cylinder 54 with the gripper. A limit switch 69, which is actuated by the guide pin 60, can be used to verify insertion. The guide pin 60 is protected within housing 72. The limit switch has three functions: (1) To assure that the gripper is in the full up position prior to activation of the gripper fingers 55 to press out against the corresponding heat exchanger tubes; (2) To detect if the camlock does not fully grip the corresponding heat exchanger tube (the limit switch will indicate that the gripper is not fully up when the gripper is pulled downward after the gripper fingers are radially extenuated, to fully seat the robot standoff pins 14 against the tube sheet 65); and (3) To detect if there is a missing tube, e.g., at the end of a row or column, or a plugged tube, because the gripper will not fully insert. This latter feature can be used to verify the position of the robot as it moves across the tube sheet and is a significant feature of this invention. With the gripper fingers 55 inserted in the tube, actuator piston 56 is forced upward with compressed air supplied through fitting 57. As the actuator piston travels upward, balls 58 roll on tapered raceways 59 bringing gripper fingers in tight contact with the tube. Balls are used to reduce friction between the gripper fingers and the actuator piston enabling a high contact force, e.g., approximately 1,000 lbs., to be obtained with a relatively small pneumatic piston diameter. The low rolling friction of the balls eliminates the self-locking property of small angle tapers. The next operational sequence for the gripper is to pressurize chamber 52 which attempts to remove the gripper fingers from the tube. Since the gripper fingers are secured to the tube, the entire gripper is biased upward forcing pins 14 in close contact with the tube sheet. With the pins tightly against the tube sheet, the manipulator is forced to stay parallel and in close proximity to the tube sheet.

For removal of the gripper from the tube, the following steps are performed. Compressed air is expelled from chamber 52 relieving the force on the gripper fingers 55. The actuator pin is lowered by introducing compressed air into fitting 62 while releasing air through fitting 57. Nose cone 63 ensures the balls are returned to their original position and that gripper fingers 55 are captured. The actuator cylinder 54 is then lowered by pressurizing chamber 52.

Figure 10B:
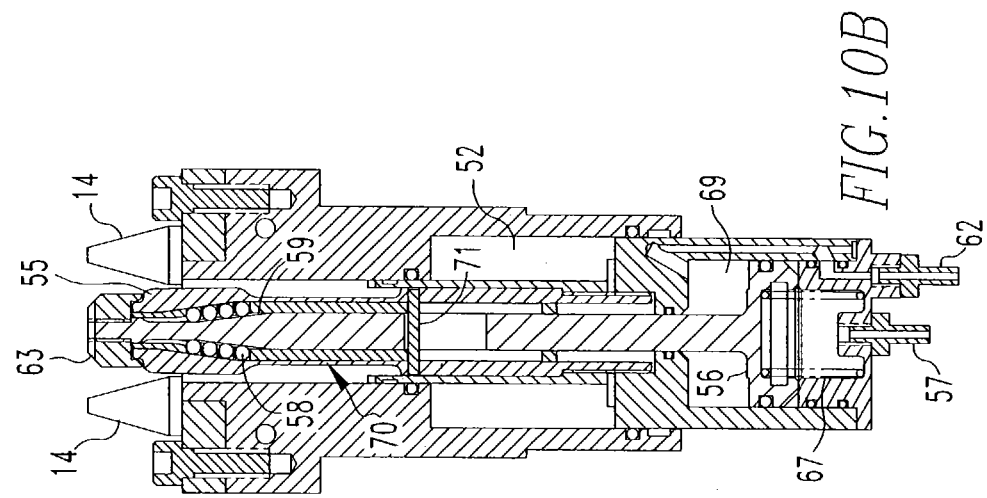
FIG. 10B is a sectional view taken along the lines H-H of FIG. 10A.
Figure 10C:
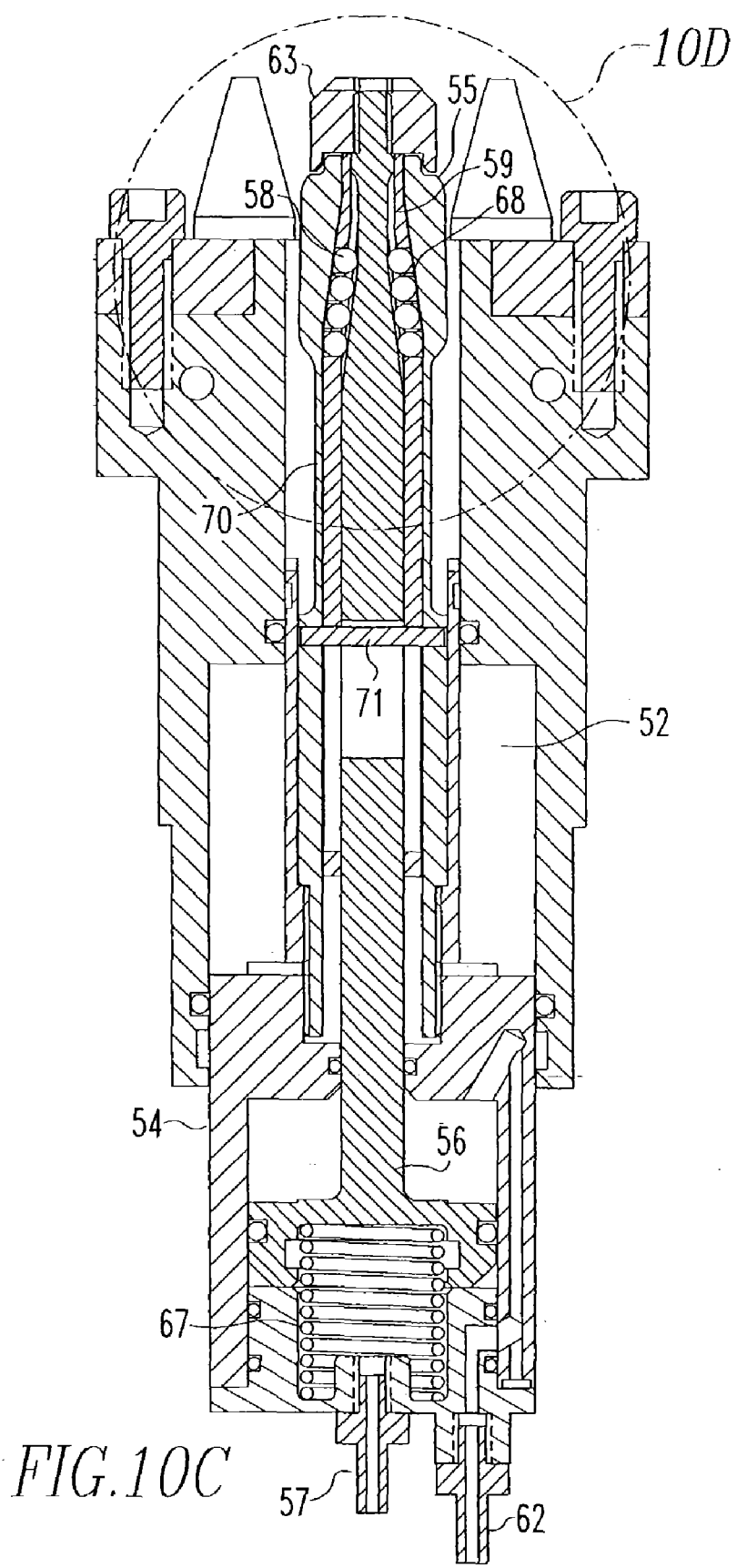
FIG. 10C is a sectional view of a second embodiment of the gripper illustrated in FIG. 10A taken along the lines H-H.

FIG. 10C is a cross section taken along the lines H-H of FIG. 10A showing a second embodiment of the gripper of this invention. Like reference characters refer to the corresponding elements previously described with respect to FIG. 10B. The difference in the embodiment of FIG. 10C over that of FIG. 10B is that a spring 67 has been added around the top of the actuator piston 56 to bias the fingers 55 against the corresponding heat exchanger tube when the fingers are inserted within the tube to prevent an unintentional release. Additionally, the ball bearings 58 are retained within a sleeve, but travel as previously stated along the raceway when the piston 56 is actuated to force the fingers 55 radially outward.

Figure 10D:
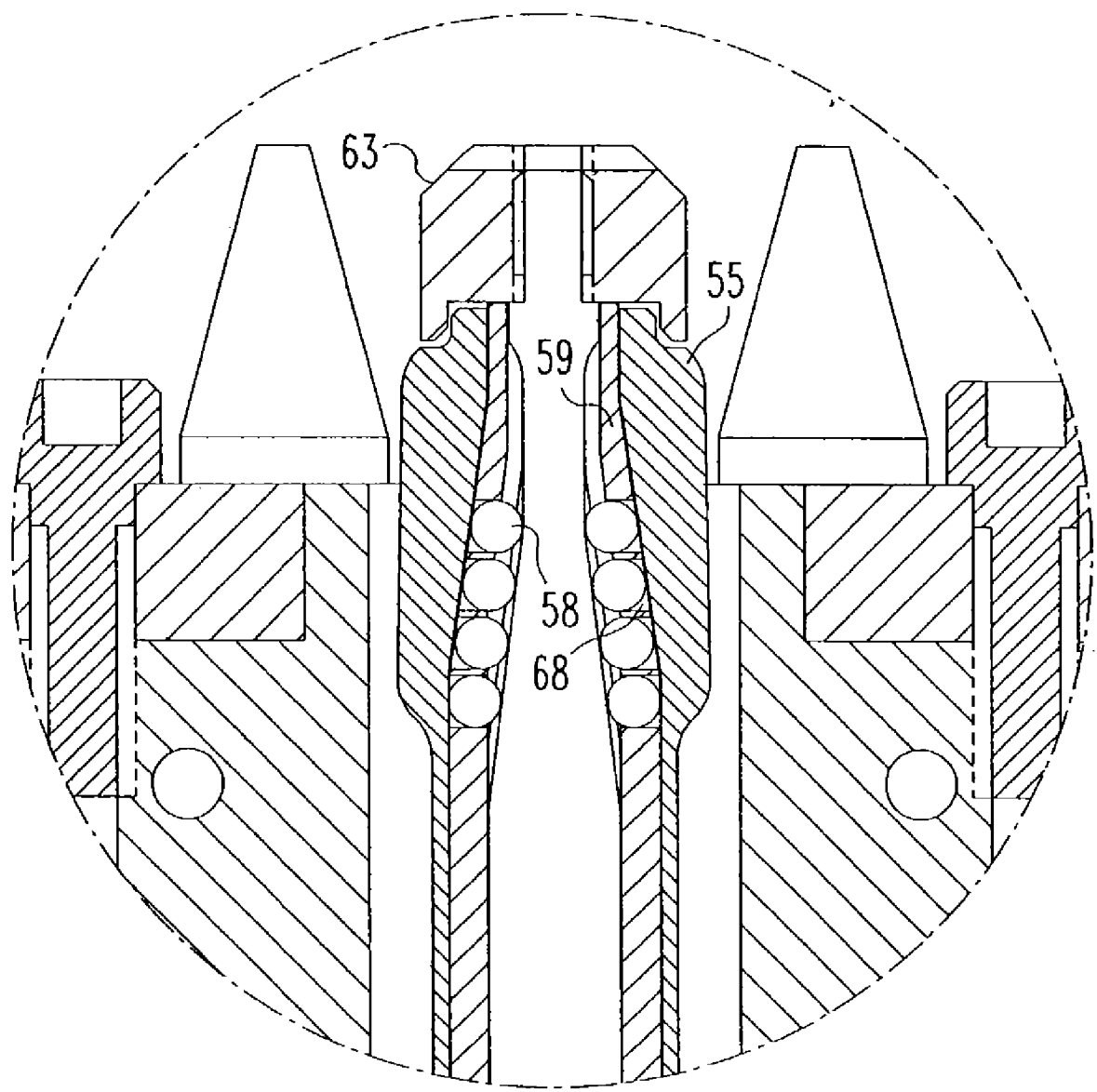
FIG. 10D is an enlargement of the gripping finger area of the gripper shown in FIG. 10C.

FIG. 10D is an enlargement of the gripping finger area of the grippers shown in FIG. 10C where it can be appreciated that the bearings 58 are retained within a sleeve 68 each supported within its own pocket and free to roll as the actuator piston moves up to force the fingers 55 radially outward. To retract the gripper fingers 55 air is introduced through the fitting 62 to force the piston in the opposite direction and the fingers 55 are forced inward, in turn forcing the ball bearings 58 within the sleeve 68 downward until they are seated at their lower extent of travel and the fingers 55 are captured by the nose cone 63. The bearing balls 58 will be forced to the lowest position when the nose cone 63 is retracted. This assures the gripper fingers 55 will be fully collapsed when the actuator piston 56 and guide 70 are retracted. The guide 70, actuator 56 and gripper fingers 55 are held rotationally fixed, with the small horizontal pin 71 in the center of the camlock to assure the balls 58 are retained in the raceways and do not move to the open slots between the gripper fingers 55. In total, there are 24 balls circumferentially-spaced in six axially-extending rows positioned substantially equidistantly, circumferentially around the actuator piston 56.

Thus, this invention provides a miniature manipulator for servicing nuclear steam generators that can accurately move at high velocity and has versatile positioning capability. A significant benefit of the small size is reduced time for set-up and installation in the field. Multiple manipulators can be utilized on each side of the channel head to reduce inspection time. The weight of the manipulator is approximately 30 lbs. or less and has an approximately 70 lb. payload capability.

While a specific embodiment of the invention has been described in detail, it will be appreciated by those skilled in the art that various modifications and alternatives to those details could be developed in light of the overall teachings of the disclosure. For example, while the preferred embodiment has been described in the environment of a nuclear heat exchanger, it should be appreciated that the manipulator of this invention can be employed to service any heat exchanger, e.g., one that is at too high a temperature for direct human contact. Accordingly, the particular arrangements disclosed are meant to illustrative only and not limiting as to the scope of the invention which is to be given the full breadth of the appended claims and any and all equivalents thereof.

What is claimed is:

1. A manipulator for servicing tubes extending through a tube sheet, comprising:
   (a) a base member having a holder for holding tooling or an inspection device, the base member also having at least one gripper for releaseably gripping a tube extending through the tube sheet;
   (b) a block member directly, rotatably connected to the base member so that the base member can rotate in a plane relative to the block member when a position of the block member is fixed and a position of the base member is not fixed and the block member can rotate relative to the base member when the position of the base member is fixed and the position of the block member is not fixed, at least a portion of the block member moveable, relative to the base member, in a linear direction in a straight line in a plane perpendicular to the plane the base member rotates in;

(c) a foot member directly connected to the block member for linear movement relative thereto, the foot member having at least one gripper for releaseably gripping a tube extending through the tube sheet;

(d) wherein the block member moves in two directions of linear travel in a straight line in the horizontal and vertical directions between the foot member and the base member, while maintaining the foot member and the base member in parallel planes; and (e) wherein at least one of the grippers on each of the base member and the foot member includes a gripper mechanism for forcing a gripping arm against an inside wall of the tube extending through the tube sheet when the gripper mechanism is actuated and a withdrawal mechanism that when actuated exerts a force in a direction to pull at least one of either the base member or the foot member associated with the at least the one of the grippers, toward the tube sheet when engaged to the tube extending through the tube sheet, to positively bias the one of the base member or the foot member against the tube sheet, the withdrawal mechanism and the gripper mechanism being separately actuated.

2. The manipulator of claim 1 including a standoff pin that cooperates with the at least one of the grippers exerting the force to draw said base member and/or said foot member in the direction of the tube sheet to maintain said base member and/or said foot member a predetermined fixed distance from the tube sheet.

3. The manipulator of claim 1 wherein the foot member and block member each have at least two spaced grippers.

4. The manipulator of claim 1 wherein each of the grippers includes insertion fingers that are respectively insertable into a corresponding one of said tubes extending through the tube sheet and each of said grippers further includes a limit switch that functions to verify a pre-selected length of insertion of the insertion fingers into the corresponding tube.

5. The manipulator of claim 1 wherein the manipulator is sized to permit more than one independently operated manipulator, of substantially the same design, to be suspended from an underside of the tube sheet in either an inlet or outlet section of a channel head of a steam generator and a more than one manipulator being operable in parallel in the same section of the channel head of the steam generator at the same time.

6. The manipulator of claim 1, herein designated as the first manipulator, suspended from the underside of a semicircular portion of a tube sheet in an inlet or outlet section of a hemispherical channel head of a steam generator including a second manipulator of substantially the same design, as the first manipulator, suspended from the same semicircular portion of the tube sheet wherein the first manipulator and the second manipulator are designed to be operable at the same time.

7. The manipulator of claim 1 wherein the manipulator is as much as approximately thirty pounds.

8. The manipulator of claim 7 wherein the manipulator supports a payload of as much as seventy pounds.

9. The manipulator of claim 1 including pneumatic and/or hydraulic drives in combination with a single motorized drive.

10. A manipulator for servicing tubes extending through a tube sheet, comprising:

(a) a base member having a holder for holding tooling or an inspection device, the base member also having at least one gripper for releaseably gripping a tube extending through the tube sheet;

(b) a block member directly, rotatably connected to the base member so that the base member can rotate in a plane relative to the block member when a position of the block member is fixed and a position of the base member is not fixed and the block member can rotate relative to the base member when the position of the base member is fixed and the position of the block member is not fixed, at least a portion of the block member moveable in a linear direction in a straight line in a plane perpendicular to the plane the base member rotates in, said rotation and linear movement of the block member being relative to the base member;

(c) a foot member directly connected to the block member for linear movement relative thereto, the foot member having at least one gripper for releaseably gripping a tube extending through the tube sheet; and (d) wherein each of the grippers includes insertion fingers that are insertable into a corresponding one of said tubes extending through the tube sheet wherein the insertion fingers are biased against an interior of the corresponding tube by an internal piston that forces ball bearings to move in a direction of movement of the piston, up a tapered raceway between the piston and the interior of the insertion fingers forcing the insertion fingers out against the interior of the corresponding tube.

11. The manipulator of claim 10 wherein the insertion fingers are spring biased in a gripping position when inserted a predetermined distance into said tubes to avoid the loss of gripping power if a motive power of the piston is lost.

* * * * *